(12) United States Patent
Rofougaran (10) Patent No.: US 8,953,945 B2
(45) Date of Patent: *Feb. 10, 2015

(54) RADIO FREQUENCY TRANSMITTER WITH ON-CHIP PHOTODIODE ARRAY

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 1094 days.

This patent is subject to a terminal disclaimer.

(21) Appl. No.: 12/946,213

(22) Filed: Nov. 15, 2010

(65) Prior Publication Data

US 2011/0058054 A1 Mar. 10, 2011

Related U.S. Application Data

(63) Continuation of application No. 11/527,960, filed on Sep. 27, 2006, now Pat. No. 7,877,026, which is a continuation-in-part of application No. 11/513,588, filed on Aug. 31, 2006, now Pat. No. 7,697,899.

(51) Int. Cl.
| | |
|---|---|
| *H04B 10/00* | (2013.01) |
| *H04N 5/335* | (2011.01) |
| *H04N 5/374* | (2011.01) |
| *H04W 4/18* | (2009.01) |
| *H04W 88/02* | (2009.01) |

(52) U.S. Cl.
CPC ............ *H04B 1/3805* (2013.01); *H04N 5/335* (2013.01); *H04N 5/374* (2013.01); *H04W 4/18* (2013.01); *H04W 88/02* (2013.01)
USPC ........ 398/115; 398/118; 398/202; 348/220.1; 348/222.1

(58) Field of Classification Search
USPC ......... 398/115, 116, 117, 202, 207, 208, 212; 348/220.1, 222.1, 223.1, 202, 203, 348/204, 115, 116, 118
See application file for complete search history.

(56) References Cited

U.S. PATENT DOCUMENTS

| | | | | |
|---|---|---|---|---|
| 4,222,076 | A * | 9/1980 | Knowlton | 358/470 |
| 6,400,824 | B1 * | 6/2002 | Mansoorian et al. | 380/269 |
| 7,450,161 | B1 * | 11/2008 | Feng et al. | 348/224.1 |
| 7,542,075 | B2 * | 6/2009 | Suzuki et al. | 348/222.1 |
| 7,877,026 | B2 * | 1/2011 | Rofougaran | 398/212 |
| 2003/0139147 | A1 * | 7/2003 | Shi | 455/82 |

(Continued)

FOREIGN PATENT DOCUMENTS

| | | | |
|---|---|---|---|
| DE | 10 2004 058879 A1 | 6/2006 | |
| WO | 9212435 A1 | 7/1992 | |

OTHER PUBLICATIONS

European Search Report; EP Application No. 07010401.3; Nov. 21, 2011; 5 pages.

(Continued)

*Primary Examiner* — M. R. Sedighian
(74) *Attorney, Agent, or Firm* — Garlick & Markison; Kevin L. Smith (57) ABSTRACT

A radio transmitter integrated circuit includes a photodiode array circuit, a digital conversion module, and a transmit baseband processing module. The photodiode array circuit converts received light into electrical image signals. The digital conversion module converts the electrical image signals into digital image signals. The transmit baseband processing module converts the digital image signals into digital transmit baseband or low IF signals.

20 Claims, 7 Drawing Sheets

(56) References Cited

U.S. PATENT DOCUMENTS

2006/0034472 A1 2/2006 Bazarjani et al.
2006/0049438 A1 3/2006 Terzioglu
2006/0079290 A1 4/2006 Seto

OTHER PUBLICATIONS

Taiwan Office Action; TW Application No. 96132603; Nov. 28, 2011; 4 pages.

Extended European Search Report; EP Application No. 07008692-1; Jun. 7, 2001; 9 pages.
Machul O et al "FP 12.2: A smart pressure transducer with on-chip readout, calibration and nonlinear temperature compensation based on spline-functions," IEEE International Solid State Circuits Conference, IEEE Service Center, New York, NY, US, vol. 40, Feb. 1, 1997.
Wise K D et al: "The coming opportunities in microsensor systems," Transducers. San Francisco, Jun. 24-27, 1991; [Proceedings of the International Conference on Solid State Sensors and Actuators], New York, IEEE, US vol. Conf. 6, Jun. 24, 1991.

* cited by examiner

RADIO FREQUENCY TRANSMITTER WITH ON-CHIP PHOTODIODE ARRAY

CROSS REFERENCE TO RELATED PATENTS/PATENT APPLICATIONS

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. Utility patent application Ser. No. 11/527,960, entitled "RADIO FREQUENCY TRANSMITTER WITH ON-CHIP PHOTODIODE ARRAY," filed Sep. 27, 2006, now issued as U.S. Pat. No. 7,877,026, on Jan. 25, 2011, which claims priority pursuant to 35 U.S.C. §120, as a continuation-in-part (CIP), to the following U.S. Utility Patent Application which is hereby incorporated herein by reference in its entirety and made part of the present U.S. Utility Patent Application for all purposes:

2. U.S. Utility patent application Ser. No. 11/513,588, entitled "RFIC WITH ON-CHIP ACOUSTIC TRANSDUCER CIRCUIT," filed Aug. 31, 2006, now issued as U.S. Pat. No. 7,697,899 on Apr. 13, 2010.

BACKGROUND a. Technical Field

This invention relates generally to wireless communication systems and more particularly to radio frequency integrated circuits.

b. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, ZigBee, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (for example, one of the plurality of radio frequency (RF) carriers of the wireless communication system or a particular RF frequency for some systems) and communicate over that channel(s). For indirect wireless communications, each wireless communication device communicates directly with an associated base station (for example, for cellular services) and/or an associated access point (for example, for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (that is, receiver and transmitter) or is coupled to an associated radio transceiver (for example, a station for in-home and/or in-building wireless communication networks, RF modem, et cetera). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In many applications of a radio transceiver, the raw data that is transmitted and/or received includes digitized video image signals (for example, MPEG (motion picture expert group) files, JPEG (joint picture expert group), and/or a combination thereof). As is known, an image sensor is used to capture analog image signals. The image sensor biases the captured analog image signals to a particular level, amplifies them, and then digitized them (for example, convert the analog signals to digital signals, which may be done in accordance with JPEG or MPEG specifications).

Recently, image sensors have been implemented as integrated circuits using a photodiode array. While integrated image sensor chips offer communication device manufacturers smaller form factors, the chips are still separate components requiring printed circuit board (PCB) space and connections to and/or from other integrated circuits on the PCB.

Therefore, a need exists for a radio frequency integrated circuit that includes an on-chip image sensor.

BRIEF SUMMARY OF THE INVENTION

The present invention is directed to apparatus and methods of operation that are further described in the following Brief Description of the Several Views of the Drawing(s), the Detailed Description of the Drawing(s), and the claims. Other features and advantages of the present invention will become apparent from the following detailed description of the invention made with reference to the accompanying drawings.

DETAILED DESCRIPTION OF THE DRAWING(S)

Figure 1:
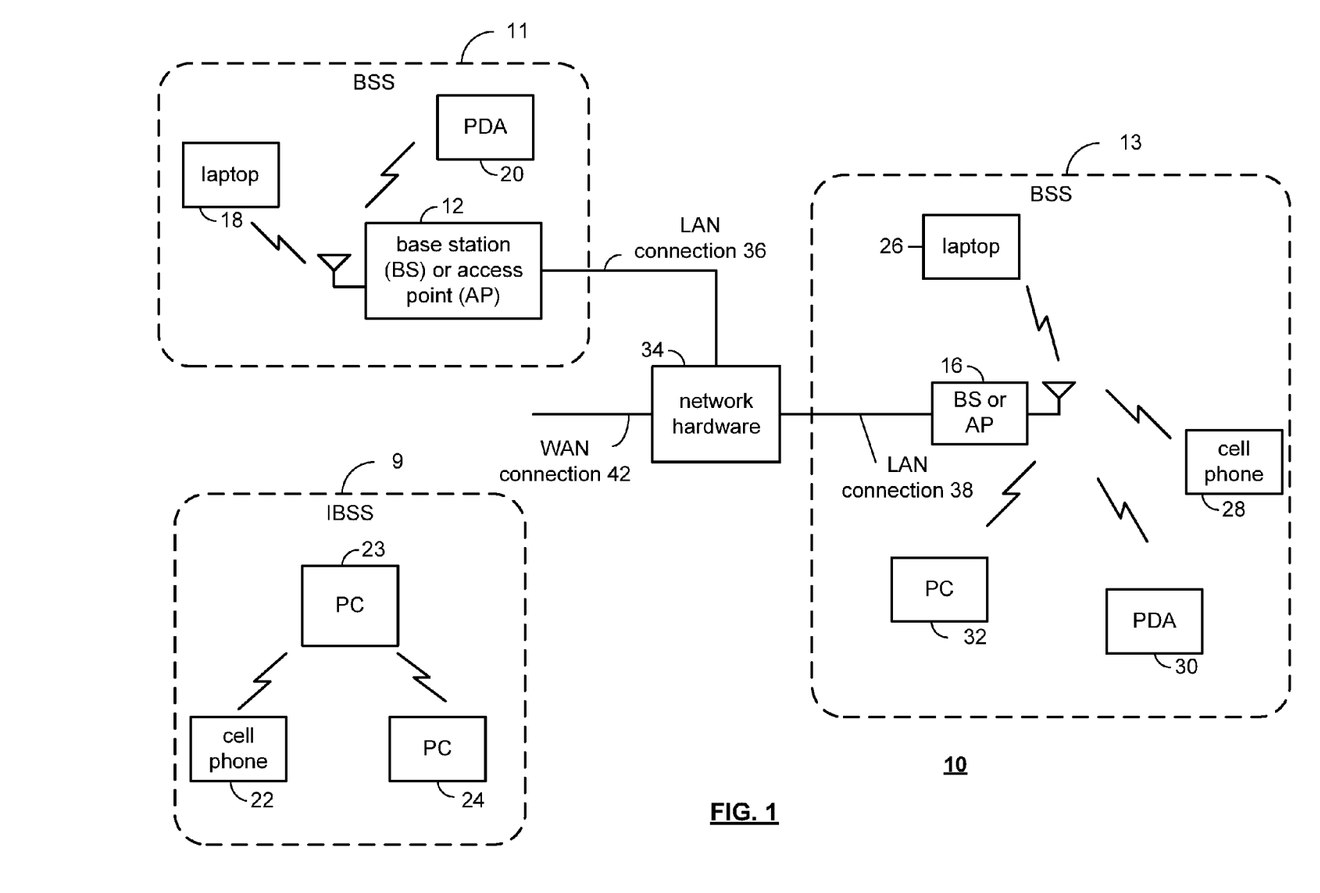
FIG. 1 is a schematic block diagram of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28 that include a built in radio transceiver and/or have an associated radio transceiver. The details of the radio transceiver will be described in greater detail with reference to FIGS. 2-8.

Wireless communication devices 22, 23, and 24 are located within an independent basic service set (IBSS) area and communicate directly (that is, point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems and like-type systems, while access points, or master transceivers, are used for in-home or in-building wireless networks (for example, IEEE 802.11 and versions thereof, Bluetooth, RFID, and/or any other type of radio frequency based network protocol). Regardless of the particular type of communication system, each wireless communication device includes a built-in radio and/or is coupled to a radio. Note that one or more of the wireless communication devices may include an RFID reader and/or an RFID tag.

Figure 2:
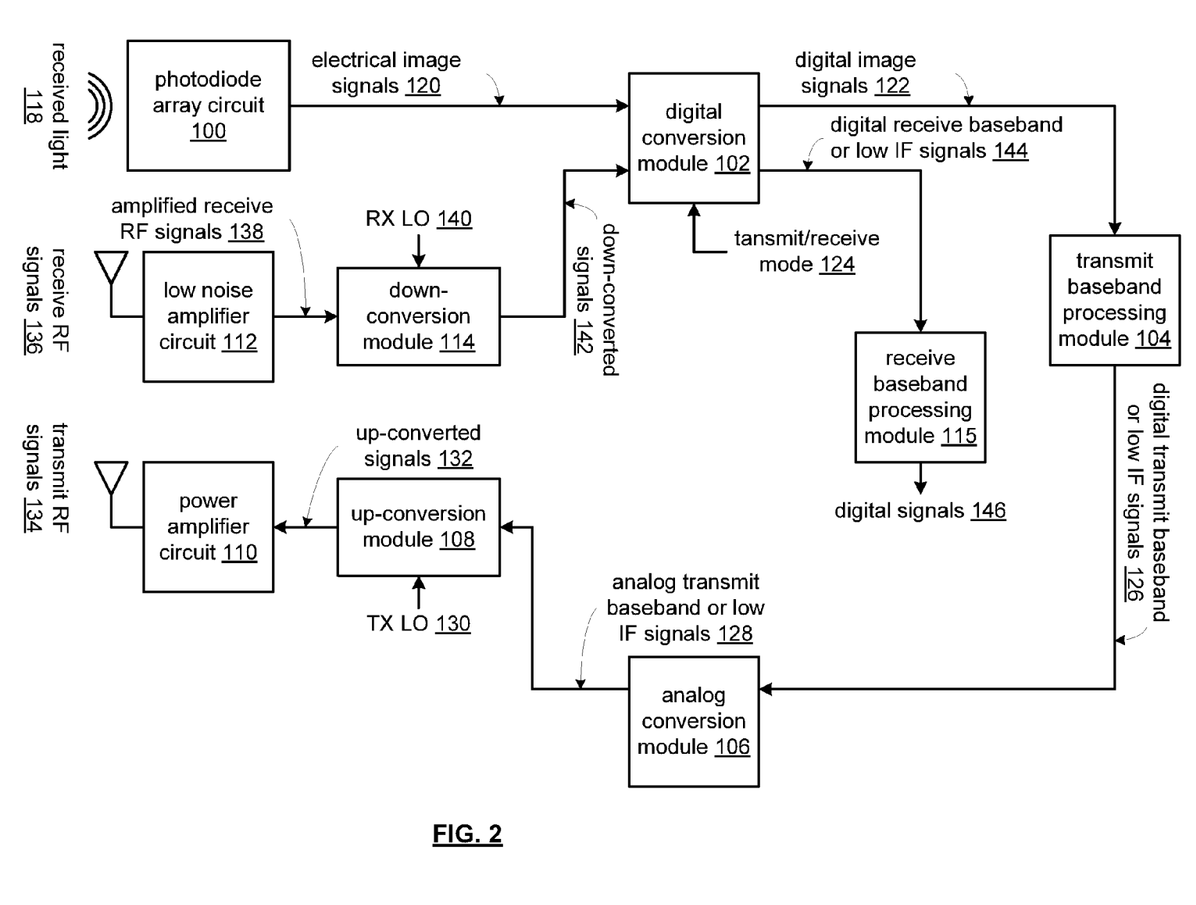
FIG. 2 is a schematic block diagram of a radio frequency integrated circuit (RFIC) in accordance with the present invention.

FIG. 2 is a schematic block diagram of a radio frequency integrated circuit (RFIC) that may be used in any of the wireless communication devices of FIG. 1 or as a radio frequency transceiver for any other RF application where audio signals are transmitted and/or received. The RFIC includes a photodiode array circuit 100, a digital conversion module 102, a transmit baseband module 104, an analog conversion module 106, an up-conversion module 108, a power amplifier circuit 110, a low noise amplifier circuit 112, a down-conversion module 114, and a receive baseband processing module 115.

The photodiode array circuit 100 (an embodiment of which will be described in greater detail with reference to FIG. 3) is coupled to convert a received light 118 into electrical image signals 120. The received light 118 is reflected off an object(s) to be captured, which is captured for a predetermined period of time as voltages by a plurality of photodiodes within the photodiode array cell. The voltages may be filtered and processed to produce the electrical image signals 120. Note that the processing of the voltages may include, but is not limited to, timing, exposure control, shutter control, white balance, and/or gain adjust. In an alternate embodiment, the photodiode array circuit includes a plurality of active pixel sensors.

The digital conversion module 102 (embodiments of which will be described in greater detail with reference to FIGS. 4-7) is coupled to convert the electrical image signals 120 into digital image signals 122 when the RFIC is in a transmit mode. The digital image signals 122 may be encoded in accordance with one or more encoding schemes, such as MPEG, JPEG, or other standardized video image encoding. Note that the RFIC may be in the transmit mode via a transmit/receive mode signal 124, may be in the transmit mode in accordance with a half duplex scheme where the transmit path and receive path of the RFIC share a wireless communication resource (for example, one or more RF channels, use the same RF carrier frequency, frequency hopping scheme, et cetera), and/or may be in the transmit mode simultaneously with the receive mode when the RFIC supports a full duplex scheme where the transmit path utilizes a different wireless communication resource than the receive path.

The transmit baseband processing module 104 is coupled to convert the digital image signals 122 into digital transmit baseband or low intermediate frequency (IF) signals 126 in accordance with one or more wireless communication standards. To achieve the conversion to the digital transmit baseband or low IF signals 126, the transmit baseband processing module 104 may perform one or more transmitter functions upon the digital transmit audio signals 122. The transmitter functions include, but are not limited to, scrambling, encoding, puncturing, mapping, modulation, and/or digital baseband to IF conversion. Note that the baseband or low IF TX signals 126 may be digital baseband signals (for example, have a zero IF) or digital low IF signals, where the low IF typically will be in a frequency range of one hundred kilohertz to a few megahertz. Further note that the transmit baseband processing module 104 and the receive baseband processing module 115 may be implemented using a shared processing device, individual processing devices, or a plurality of processing devices and may further included associated memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 104 and/or 115 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

The analog conversion module 106 is coupled to convert the digital transmit baseband or low IF signals 126 into analog transmit baseband or low IF signals 128 when the RFIC is in the transmit mode. The up-conversion module 108 is coupled to convert the analog transmit baseband or low IF signals 128, which may include in-phase components and quadrature components, into up-converted signals 132 based on a transmit local oscillation 130. The up-conversion module 108 may be a direct conversion module where the transmit local oscillation 130 corresponds to the difference between the IF of the analog transmit baseband or low IF signals 128 and the carrier frequency of the transmit RF signals 134. Alternatively, the up-conversion module 108 may be a superheterodyne module where the transmit local oscillation 130 includes two oscillations: one to convert the analog baseband or low IF signals 128 into intermediate frequency signals and a second to convert the intermediate frequency signals into signals having the carrier frequency of the transmit RF signals 134. Note that when the analog transmit baseband or low IF signals 128 includes in-phase components and quadrature components, the transmit local oscillation 130 includes an in-phase component and a quadrature component such that the quadrature component of the transmit local oscillation is mixed with the quadrature components of the analog transmit baseband or low IF signals 128 and the in-phase component of the transmit local oscillation is mixed with the in-phase components of the analog transmit baseband or low IF signals 128.

The power amplifier circuit 110 is coupled to amplify the up-converted signals 132 to produce the transmit radio frequency (RF) signals 134. The power amplifier circuit 110 may include one or more power amplifiers and/or one or more pre-amplifiers coupled in series, in parallel or combination thereof. The amplification provided by the power amplifier circuit 110 is dependent upon the desired transmit power and whether an off-chip power amplifier is used. The power amplifier circuit 110 provides the transmit RF signals 134 to an antenna structure for over-the-air transmission.

The antenna structure may include a separate antenna(s) for the receive path and the transmit path of the RFIC or the transmit and receive paths may share an antenna(s) via a transmit/receive switch and/or transformer balun. In another embodiment, the receive and transmit paths may share a diversity antenna structure. In another embodiment, the receive and transmit paths may each have its own diversity antenna structure. In another embodiment, the receive and transmit paths may share a multiple input multiple output (MIMO) antenna structure. Accordingly, the antenna structure coupled to, or integrated on, the RFIC will depend on the particular standard(s) to which the wireless transceiver is compliant.

The low noise amplifier (LNA) circuit 112 is coupled to amplify receive RF signals 136 to produce amplified receive RF signals 138. The LNA circuit 112 may include one or more amplifiers and/or one or more pre-amplifiers coupled in series, in parallel, or a combination thereof to amplify the receive RF signals 136 based on a gain setting. The gain setting is at least partially dependent upon the signal strength of the receive RF signals 136 and the desired operating range of the receive path.

The down-conversion module 114 is coupled to convert the amplified receive RF signals 138 into the down-converted signals 142 based on a receive local oscillation 140. The down-conversion module 114 may be a direct conversion module where the receive local oscillation 140 corresponds to a difference between the IF of the down-converted signals 142 (for example, a zero IF or a low IF of a few Mega Hertz or less) and the carrier frequency of the receive RF signals 136. Alternatively, the down-conversion module 114 may be a superheterodyne module where the receive local oscillation 140 includes two oscillations: one to convert the receive RF signals 136 into intermediate frequency signals and a second to convert the intermediate frequency signals into the down-converted signals 142. Note that LNA circuit 112 may provide in-phase components and quadrature components of the amplified receive RF signals 138 to the down-conversion module 114. In this instance, the receive local oscillation 140 includes an in-phase component and a quadrature component such that the quadrature component of the receive local oscillation 140 is mixed with the quadrature components of the amplified receive RF signals 138 and the in-phase component of the receive local oscillation 140 is mixed with the in-phase components of the amplified receive RF signals 138.

The digital conversion module 102 converts the down-converted signals 142 into digital receive baseband or low intermediate frequency (IF) signals 144 when the RFIC is in a receive mode. Note that the RFIC may be in the receive mode via a transmit/receive mode signal 124, may be in the receive mode in accordance with a half duplex scheme where the transmit path and receive path of the RFIC share a wireless communication resource (for example, one or more RF channels, use the same RF carrier frequency, frequency hopping scheme, et cetera), and/or may be in the receive mode simultaneously with the transmit mode when the RFIC supports a full duplex scheme where the transmit path utilizes a different wireless communication resource than the receive path.

The receive baseband processing module 115 is coupled to convert the digital receive baseband or low IF signals 144 into the digital signals 146. To achieve the conversion to the digital signals 146, the receive baseband processing module 115 may perform one or more receiver functions upon the digital receive baseband or low IF signals 144. The receiver functions include, but are not limited to, digital intermediate frequency to baseband conversion, demodulation, demapping, depuncturing, decoding, and/or descrambling. Note that the digital receive baseband or low IF signals 144 may be digital baseband signals (for example, have a zero IF) or digital low IF signals, where the low IF typically will be in a frequency range of one hundred kilohertz to a few megahertz.

As one of ordinary skill in the art will appreciate, the RFIC may be fabricated on a single die and placed within a conventional integrated circuit (IC) package (for example, ball grid array, surface mount, et cetera). Alternatively, the RFIC may be fabricated on two dies that are placed within a single conventional IC package. For instance, a first die may support the transmit acoustic transducer circuit 100, the digital conversion module 102, the transmit baseband processing module 104, the analog conversion module 106, the receive baseband processing module 115, and the receive acoustic transducer circuit 116 and a second die that supports the up-conversion module 108, the power amplifier circuit 110, the low noise amplifier circuit 112, and the down-conversion module 114. As another alternative, the RFIC may be fabricated on two dies that are placed in separate conventional IC package.

Figure 3:
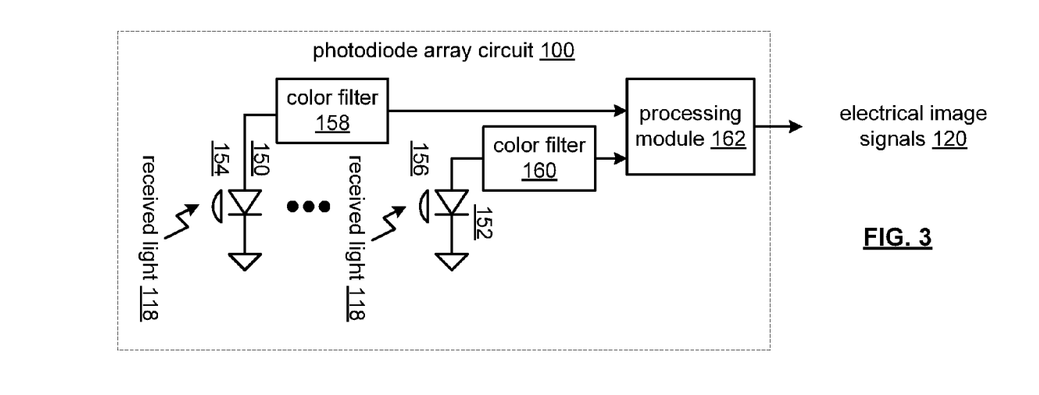
FIG. 3 is a schematic block diagram of an embodiment of a photodiode array circuit in accordance with the present invention.

FIG. 3 is a schematic block diagram of an embodiment of a photodiode array circuit 100 that includes a plurality of lens 154-156, a plurality of photodiodes 150-152, a plurality of color filters 158-160, and a processing module 162. The processing module 162 may be separate processing device from the transmit and receive baseband processing modules 104 and 115 or may be part of one or both of the transmit and receive baseband processing modules 104 and 115.

In operation, the plurality of lens 154-156 is positioned to provide the received light to the plurality of photodiodes. As shown, one lens 154 is positioned proximal to a corresponding one 150 of the plurality of photodiodes 150-152 to focus the received light 118 and present it to the corresponding photodiode.

The plurality of photodiodes 150-152 is arranged into an array of columns and rows to produce a plurality of black and white electrical signals from the received light. The processing module 162 controls the exposure and other aspects of the photodiodes producing the black and white electrical signals. The plurality of color filters 158-160 filters the plurality of black and white electrical signals to produce a plurality of color electrical signals. The processing module 162 processes the plurality of color electrical signals to produce the electrical image signals, wherein the processing includes at least one of: timing, exposure control, shutter control, white balance, and gain adjust.

Figure 4:
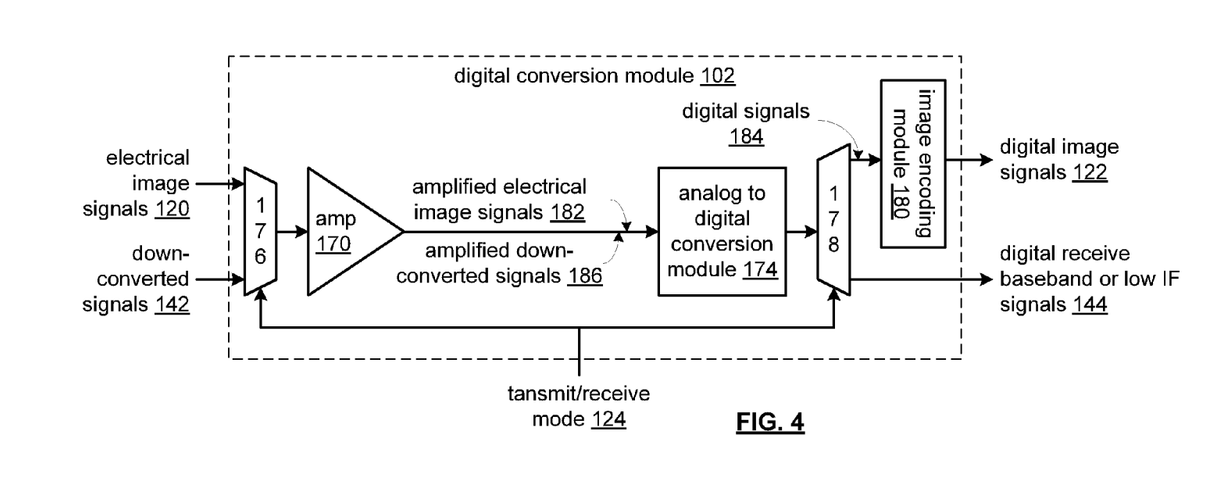
FIG. 4 is a schematic block diagram of an embodiment of a digital conversion module in accordance with the present invention.

FIG. 4 is a schematic block diagram of an embodiment of a digital conversion module that includes a multiplexer 176, an amplifier 170, an analog to digital conversion module 174, a multiplexer 178, and an image encoding module 180. The multiplexers 176 and 178, which may be switches, gates, connection nodes, and/or multiplexers, are controlled by the status of the transmit/receive mode signal 124. Note that when the RFIC is in a half duplex mode, the transmit/receive mode signal 124 may be inherent in the RFIC based on whether the transmit path is active or the receive path is active. In this instance, the multiplexers 176 and 178 may be implemented as the connection nodes (that is, electrically connection with one line active and the other inactive in accordance with the RFIC half duplex operation).

When the RFIC is in the transmit mode, multiplexer 176 provides the electrical image signals 120 to the amplifier 170. The amplifier 170 amplifies the electrical image signals 120 in accordance with a pre-established gain setting or an automatic gain control setting to produce amplified electrical image signals 182. The analog to digital conversion module 174, which may include one or more analog to digital converters, is coupled to convert the amplified electrical image signals 182 into digital signals 184. Multiplexer 178 provides the digital signals 184 to the image encoding module 180.

The image encoding module 180 may be a separate processing device from the transmit baseband processing module 104, may share a processing device with the transmit baseband processing module 104, or may be a module within the transmit baseband processing module 104. Regardless of the specific implementation, the image encoding module 180 perform one or more types of image encoding upon the digital signals 184 to produce the digital image signals 122. Such encoding includes MPEG, JPEG, and/or other video image encoding standards.

When the RFIC is in the receive mode, the multiplexer 176 provides the down-converted signals 142 to the amplifier 170. The amplifier 170 amplifies the down-converted signals 142 in accordance with an automatic gain control setting to produce amplified down-converted signals 186. Note that if the down-converted signals 142 include in-phase components and quadrature components, the amplifier 170 includes an in-phase amplifier to amplify the in-phase components and a quadrature amplifier to amplify the quadrature components.

The analog to digital conversion module 174 converts the amplified down-converted signals 186 into the digital receive baseband or low IF signals 144. Note that when the down-converted signals 142 include in-phase components and quadrature components, the analog to digital conversion module 174 includes an in-phase analog to digital converter to convert the in-phase components and a quadrature analog to digital converter to convert the quadrature components. Multiplexer 178 provides the digital receive baseband or low IF signals 142 to the receive baseband processing module 115.

Figure 5:
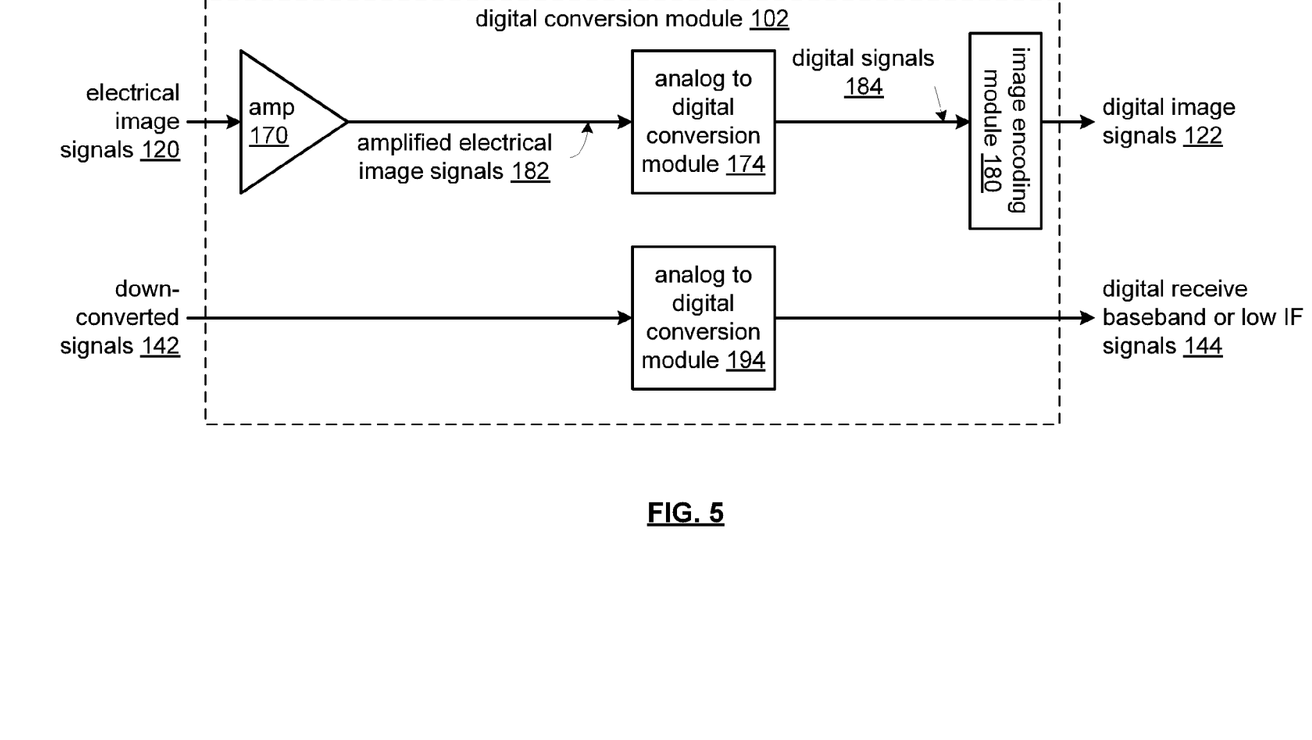
FIG. 5 is a schematic block diagram of another embodiment of a digital conversion module in accordance with the present invention.

FIG. 5 is a schematic block diagram of an embodiment of the digital conversion module 102 that includes an amplifier 170, an analog to digital conversion (ADC) module 174, an analog to digital conversion module 194, and the image encoding module 180. In this embodiment, when the RFIC is in the transmit mode, the amplifier 170, ADC module 174, and the image encoding module 180 are active, while the ADC module 194 is inactive and when the RFIC is in the receive mode, the amplifier 170, ADC module 174, and the image encoding module 180 are inactive, while the ADC module 194 is active.

When the RFIC is in the transmit mode, the amplifier 170 amplifies the electrical image signals 120 in accordance with a pre-established gain setting or an automatic gain control setting to produce amplified electrical image signals 182. The analog to digital conversion module 174, which may include one or more analog to digital converters, is coupled to convert the amplified electrical image signals 182 into digital signals 184. The image encoding module 180 perform one or more types of image encoding upon the transmit digital signals 184 to produce the digital image signals 122.

When the RFIC is in the receive mode, the analog to digital conversion module 194 converts the down-converted signals 142 into the digital receive baseband or low IF signals 144. Note that when the down-converted signals 142 include in-phase components and quadrature components, the analog to digital conversion module 194 includes an in-phase analog to digital converter to convert the in-phase components and a quadrature analog to digital converter to convert the quadrature components.

Figure 6:
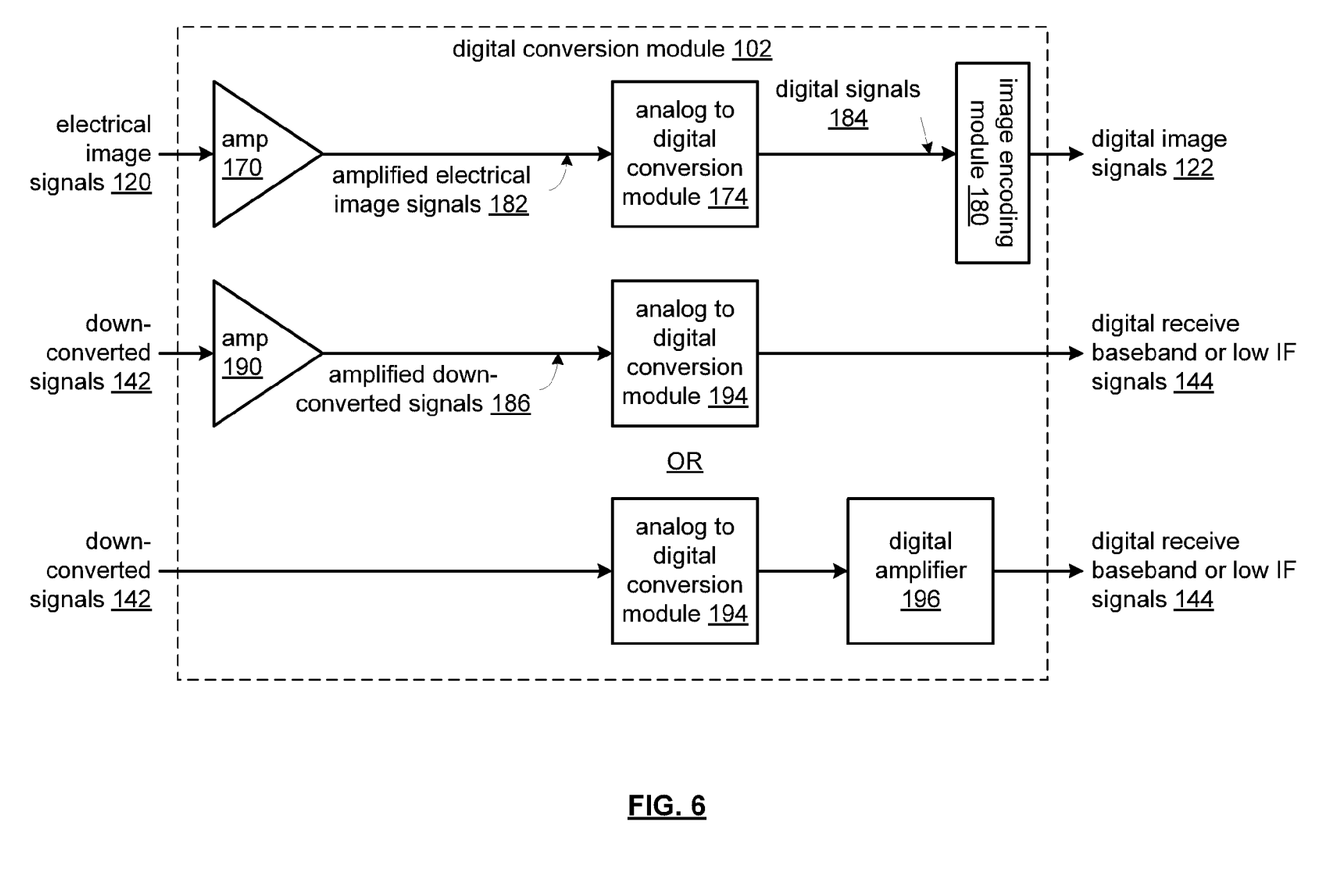
FIG. 6 is a schematic block diagram of another embodiment of a digital conversion module in accordance with the present invention.

FIG. 6 is a schematic block diagram of an embodiment of the digital conversion module 102 that includes amplifier 170, the analog to digital conversion module 174, the image encoding module 180, the analog to digital conversion module 194, amplifier 190 or digital amplifier 196. In this embodiment, when the RFIC is in the transmit mode, the amplifier 170, ADC module 174, and the image encoding module 180 are active, while the ADC module 194 and the amplifier 190 or digital amplifier 196 are inactive and when the RFIC is in the receive mode, the amplifier 170, ADC module 174, and the image encoding module 180 are inactive, while the ADC module 194 and the amplifier 190 or digital amplifier 196 are active.

When the RFIC is in the transmit mode, the amplifier 170 amplifies the electrical image signals 120 in accordance with a pre-established gain setting or an automatic gain control setting to produce amplified electrical image signals 182. The analog to digital conversion module 174, which may include one or more analog to digital converters, is coupled to convert the amplified electrical image signals 182 into digital signals 184. The image encoding module 180 perform one or more types of image encoding upon the digital signals 184 to produce the digital image signals 122.

When the RFIC is in the receive mode, the amplifier 190 amplifies the down-converted signals 142 to produce amplified down-converted signals 186. The analog to digital conversion module 194 converts the amplified down-converted signals 186 into the digital receive baseband or low IF signals 144. Note that when the down-converted signals 142 include in-phase components and quadrature components, the analog to digital conversion module 194 includes an in-phase analog to digital converter to convert the in-phase components and a quadrature analog to digital converter to convert the quadrature components. In an alternative embodiment, the analog to digital conversion module 194 converts the amplified down-converted signals 186 into pre-amplified digital receive baseband or low IF signals. The digital amplifier 196 amplifies the pre-amplified digital receive baseband or low IF signals to produce the digital receive baseband or low IF signals 144.

Figure 7:
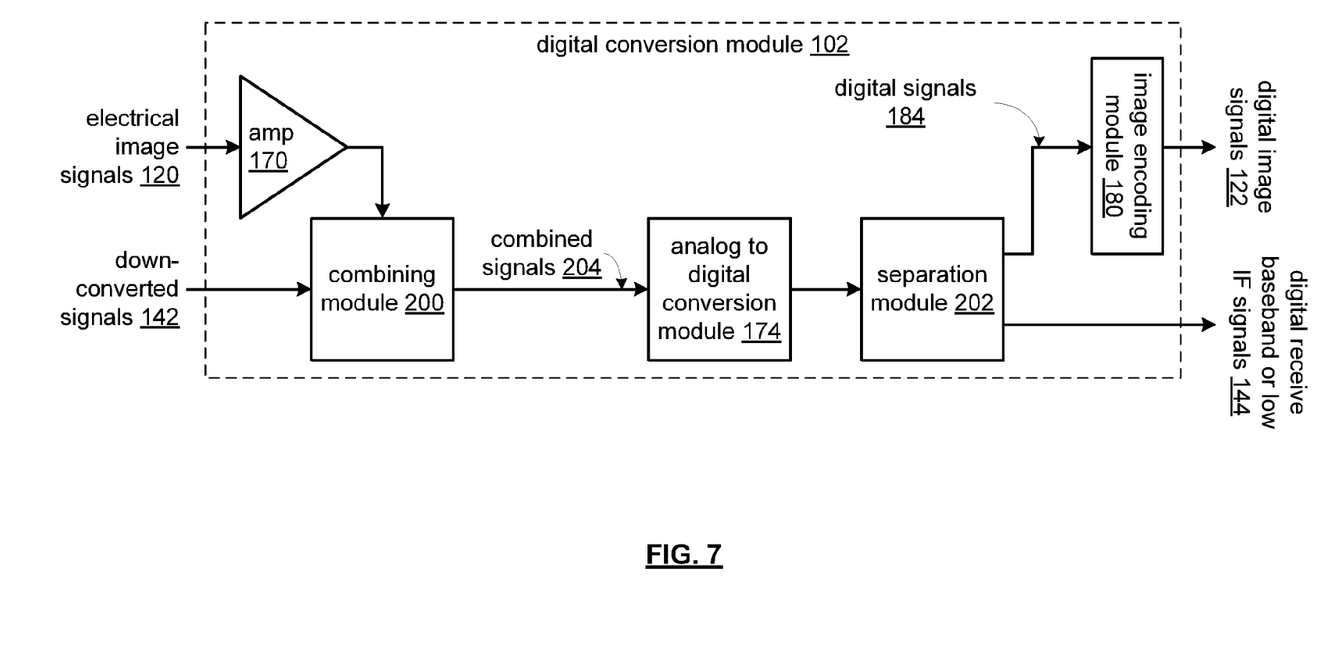
FIG. 7 is a schematic block diagram of another embodiment of a digital conversion module in accordance with the present invention.

FIG. 7 is a schematic block diagram of an embodiment of the digital conversion module 102 that includes amplifier 170, a combining module 200, the analog to digital conversion module 174, a separation module 202, and the image encoding module 180. In this embodiment, the RFIC is in a full duplex mode (that is, simultaneously in the receive mode and transmit mode) where the transmit path uses a different frequency range than the receive path.

In this embodiment, the amplifier 170 amplifies the electrical image signals 120 based on a pre-determined gain setting and/or an automatic gain control setting to produce amplified electrical image signals 120. The combining module 200 combines the amplified electrical image signals with the down-converted signals 142 to produce combined signals 204. For example, the combining module 200 may be a summation module that sums the amplified electrical image signals (for example, $\cos(\alpha t)$) with the down-converted signals 142 (for example, $\cos(\omega_{IF} t)$) to produce the combined signals $(2 \cos 1/2(\alpha t+\omega_{IF} t)\cos 1/2(\alpha t-\omega_{IF} t)=\cos^2 \alpha t-\sin^2 \omega_{IF} t)$. Note that if the down-converted signals 142 include in-phase and quadrature components, the combining module 200 may combine the amplified electrical image signals with the in-phase components and/or the quadrature components.

The analog to digital conversion module 174 converts the combined signals 204 into digital combined signals. The separation module 202 separates the digital combined signals into the digital signals 184 and the digital receive baseband or low IF signals 144. In one embodiment, the separation module 200 may include a first digital filter and a second digital filter. The first digital filter is tuned to pass the $\cos^2 \alpha t$ component of the combined signals 204 while substantially attenuating the $\sin^2 \omega_{IF} t$ component of the combined signals 204 and the second digital filter is tuned to pass the $\sin^2 \omega_{IF} t$ component of the combined signals 204 while substantially attenuating the $\cos^2 \alpha t$ component of the combined signals 204. The separation module 200 may further include a digital square root function to obtain $\cos \alpha t$ and $\sin \omega_{IF} t$ and may further include a digital 90° phase shift module to phase shift $\sin \omega_{IF} t$ to obtain $\cos \omega_{IF} t$. The image encoding module 180 perform one or more types of image encoding upon the digital signals 184 to produce the digital image signals 122.

Figure 8:
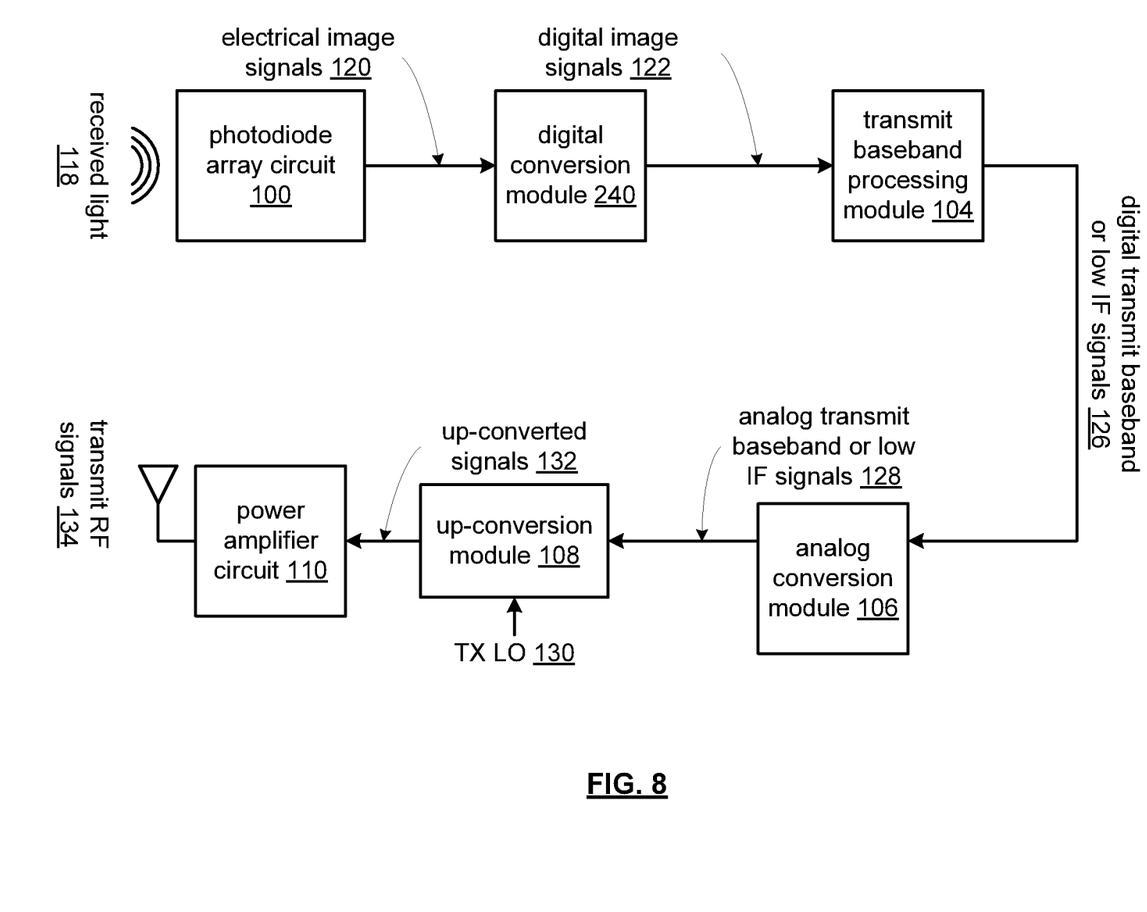
FIG. 8 is a schematic block diagram of a radio transmitter integrated circuit (RTIC) in accordance with the present invention.

FIG. 8 is a schematic block diagram of a radio transmitter integrated circuit (RTIC) that includes a photodiode array circuit 100, a digital conversion module 240, a transmit baseband module 104, an analog conversion module 106, an up-conversion module 108, and a power amplifier circuit 110.

The photodiode array circuit 100 is coupled to convert a received light 118 into electrical image signals 120. The received light 118 is reflected off an object(s) to be captured, which is captured for a predetermined period of time as voltages by a plurality of photodiodes within the photodiode array cell. The voltages may be filtered and processed to produce the electrical image signals 120. Note that the processing of the voltages may include, but is not limited to, timing, exposure control, shutter control, white balance, and/or gain adjust. In an alternate embodiment, the photodiode array circuit 100 includes a plurality of active pixel sensors.

The digital conversion module 240, which may be implemented in accordance with one of the embodiments of digital conversion module 102 of FIGS. 4-7 less the digital conversion of the down converted signals 142, is coupled to convert the electrical image signals 120 into digital image signals 122. The digital image signals 122 may be encoded in accordance with one or more encoding schemes, such as MPEG, JPEG, or other standardized video image encoding.

The transmit baseband processing module 104 is coupled to convert the digital image signals 122 into digital transmit baseband or low intermediate frequency (IF) signals 126 in accordance with one or more wireless communication standards. To achieve the conversion to the digital transmit baseband or low IF signals 126, the transmit baseband processing module 104 may perform one or more transmitter functions upon the digital transmit audio signals 122. The transmitter functions include, but are not limited to, scrambling, encoding, puncturing, mapping, modulation, and/or digital baseband to IF conversion. Note that the baseband or low IF TX signals 126 may be digital baseband signals (for example, have a zero IF) or digital low IF signals, where the low IF typically will be in a frequency range of one hundred kilohertz to a few megahertz. Further note that the transmit baseband processing module 104 may be implemented using a shared processing device, individual processing devices, or a plurality of processing devices and may further included associated memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 104 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

The analog conversion module 106 is coupled to convert the digital transmit baseband or low IF signals 126 into analog transmit baseband or low IF signals 128 when the RFIC is in the transmit mode. The up-conversion module 108 is coupled to convert the analog transmit baseband or low IF signals 128, which may include in-phase components and quadrature components, into up-converted signals 132 based on a transmit local oscillation 130. The up-conversion module 108 may be a direct conversion module where the transmit local oscillation 130 corresponds to the difference between the IF of the analog transmit baseband or low IF signals 128 and the carrier frequency of the transmit RF signals 134. Alternatively, the up-conversion module 108 may be a superheterodyne module where the transmit local oscillation 130 includes two oscillations: one to convert the analog baseband or low IF signals 128 into intermediate frequency signals and a second to convert the intermediate frequency signals into signals having the carrier frequency of the transmit RF signals 134. Note that when the analog transmit baseband or low IF signals 128 includes in-phase components and quadrature components, the transmit local oscillation 130 includes an in-phase component and a quadrature component such that the quadrature component of the transmit local oscillation is mixed with the quadrature components of the analog transmit baseband or low IF signals 128 and the in-phase component of the transmit local oscillation is mixed with the in-phase components of the analog transmit baseband or low IF signals 128.

The power amplifier circuit 110 is coupled to amplify the up-converted signals 132 to produce the transmit radio frequency (RF) signals 134. The power amplifier circuit 110 may include one or more power amplifiers and/or one or more pre-amplifiers coupled in series, in parallel or combination thereof. The amplification provided by the power amplifier circuit 110 is dependent upon the desired transmit power and whether an off-chip power amplifier is used. The power amplifier circuit 110 provides the transmit RF signals 134 to an antenna structure for over-the-air transmission.

The antenna structure may include a separate antenna(s) for the receive path and the transmit path of the RFIC or the transmit and receive paths may share an antenna(s) via a transmit/receive switch and/or transformer balun. In another embodiment, the receive and transmit paths may share a diversity antenna structure. In another embodiment, the receive and transmit paths may each have its own diversity antenna structure. In another embodiment, the receive and transmit paths may share a multiple input multiple output (MIMO) antenna structure. Accordingly, the antenna structure coupled to, or integrated on, the RFIC will depend on the particular standard(s) to which the wireless transceiver is compliant.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (for example, an item includes, but is not limited to, a component, an element, a circuit, and/or a module) where, for indirect coupling, the intervening item does not modify the information of a signal but may adjust its current level, voltage level, and/or power level. As may further be used herein, inferred coupling (that is, where one element is coupled to another element by inference) includes direct and indirect coupling between two items in the same manner as "coupled to". As may even further be used herein, the term "operable to" indicates that an item includes one or more of power connections, input(s), output(s), et cetera, to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, et cetera, provides a desired relationship. For example, when the desired relationship is that a first signal has a greater magnitude than a second signal, a favorable comparison may be achieved when the magnitude of the first signal is greater than that of the second signal or when the magnitude of second signal is less than that of first signal.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A radio frequency integrated circuit (RFIC) comprises:
    a photodiode array circuit that converts received light into electrical image signals;
    a digital conversion module that converts the electrical image signals into digital image signals when the RFIC is in a transmit mode based on a transmit/receive mode signal and to convert down-converted signals into digital receive baseband signals or low intermediate frequency (IF) signals when the RFIC is in a receive mode based on the transmit/receive mode signal, wherein the digital conversion module including an analog to digital conversion module coupled to convert the electrical image signals into the digital image signals when the RFIC is in the transmit mode and to convert the down-converted signals into the digital receive baseband or low IF signals when the RFIC is in the receive mode; and
    a transmit baseband processing module that converts the digital image signals into digital transmit baseband or low IF signals when the RFIC is in the transmit mode.

2. The RFIC of claim 1, wherein the photodiode array circuit comprises:
    a plurality of photodiodes to produce a plurality of black and white electrical signals from the received light;
    a plurality of lens positioned to provide the received light to the plurality of photodiodes;
    a plurality of color filters coupled to filter the plurality of black and white electrical signals to produce a plurality of color electrical signals; and
    a processing module coupled to process the plurality of color electrical signals to produce the electrical image signals, wherein the processing includes at least one of: timing, exposure control, shutter control, white balance, and gain adjust.

3. The RFIC of claim 1, wherein the photodiode array circuit comprises:
a plurality of active pixel sensors.

4. The RFIC of claim 1, wherein the digital conversion module further comprises:
an amplifier coupled to amplify the electrical image signals to produce amplified electrical image signals when the RFIC is in the transmit mode and to amplify the down-converted signals to produce amplified down-converted signals when the RFIC is in the receive mode; and
an image encoding module coupled to convert the digital signals into the digital image signals.

5. The RFIC of claim 4, wherein the image encoding module comprises at least one of:
an initial imaging processing module;
a joint picture expert group (JPEG) encoding module; and
a motion picture expert group (MPEG) encoding module.

6. The RFIC of claim 1, wherein the digital conversion module comprises:
an amplifier coupled to amplify the electrical image signals to produce amplified electrical image signals when the RFIC is in the transmit mode;
the analog to digital conversion module including:
a first analog to digital conversion module coupled to convert the amplified electrical image signals into digital signals when the RFIC is in the transmit mode; and
a second analog to digital conversion module coupled to convert the down-converted signals into the digital receive baseband or low IF signals when the RFIC is in the receive mode; and
an image encoding module coupled to convert the digital signals into the digital image signals.

7. The RFIC of claim 6, wherein the digital conversion module further comprises:
a second amplifier coupled to amplify the down-converted signals prior to the second analog to digital conversion module converting the down-converted signals into the digital receive baseband or low IF signals.

8. The RFIC of claim 6, wherein the digital conversion module further comprises:
a digital amplifier coupled to amplify the digital receive baseband or low IF signals.

9. The RFIC of claim 1, wherein the digital conversion module comprises:
an amplifier coupled to amplify the electrical image signals to produce amplified electrical image signals;
a combining module coupled to combine the amplified electrical image signals with the down-converted signals to produce combined signals;
the analog to digital conversion module coupled to convert the combined signals into digital combined signals;
a separation module coupled to separate the digital combined signals into digital signals and digital receive baseband or low IF signals; and
an image encoding module coupled to convert the digital signals into the digital image signals, wherein the transmit RF signals are within a transmit frequency band and the receive RF signals are within a receive frequency band such that the RFIC is simultaneously in the transmit mode and the receive mode.

10. The RFIC of claim 1 further comprises:
an analog conversion module that converts the digital transmit baseband or the low IF signals into analog transmit baseband or low IF signals;
an up-conversion module that converts the analog transmit baseband or low IF signals into up-converted signals based on a transmit local oscillation;
a power amplifier circuit that amplifies the up-converted signals to produce transmit radio frequency (RF) signals;
a low noise amplifier circuit that amplifies receive RF signals to produce amplified receive RF signals when the RFIC is in the receive mode;
a down-conversion module that converts the amplified receive RF signals into down-converted signals based on a receive local oscillation when the RFIC is in the receive mode; and
a receive baseband processing module that converts the digital receive baseband or low IF signals into the digital signals when the RFIC is in the receive mode.

11. A radio transmitter integrated circuit (RTIC) comprises:
a photodiode array circuit that converts received light into electrical image signals;
a digital conversion module that converts the electrical image signals into digital image signals, the digital conversion module including:
an analog to digital conversion module to convert the electrical image signals into digital signals; and
an image encoding module to convert the digital signals into the digital image signals;
a transmit baseband processing module that converts the digital image signals into at least one of digital transmit baseband signals and low IF signals;
an analog conversion module to convert the at least one of the digital transmit baseband signals and the low IF signals into at least one of analog transmit baseband signals and low IF signals;
an up-conversion module to convert the at least one of the analog transmit baseband signals and the low IF signals into up-converted signals based on a transmit local oscillation; and
a power amplifier circuit to amplify the up-converted signals to produce transmit radio frequency (RF) signals.

12. The RTIC of claim 11, wherein the photodiode array circuit comprises:
a plurality of photodiodes to produce a plurality of black and white electrical signals from the received light;
a plurality of lens to provide the received light to the plurality of photodiodes;
a plurality of color filters to filter the plurality of black and white electrical signals to produce a plurality of color electrical signals; and
a processing module to process the plurality of color electrical signals to produce the electrical image signals, wherein the processing includes at least one of: timing, exposure control, shutter control, white balance, and gain adjust.

13. The RTIC of claim 11, wherein the photodiode array circuit comprises:
a plurality of active pixel sensors.

14. The RTIC of claim 11, wherein the digital conversion module comprises:
an amplifier to amplify the electrical image signals to produce amplified electrical image signals.

15. The RTIC of claim 14, wherein the image encoding module comprises at least one of:
an initial imaging processing module;
a joint picture expert group (JPEG) encoding module; and
a motion picture expert group (MPEG) encoding module.

16. A radio frequency integrated circuit (RFIC) comprises:
a photodiode array circuit that converts received light into electrical image signals;
a digital conversion module that converts the electrical image signals into digital image signals when the RFIC is in a transmit mode and to convert down-converted signals into digital receive baseband signals or low intermediate frequency (IF) signals when the RFIC is in a receive mode, wherein the digital conversion module including an analog to digital conversion module coupled to convert the electrical image signals into the digital image signals when the RFIC is in the transmit mode and to convert the down-converted signals into the digital receive baseband or low IF signals when the RFIC is in the receive mode; and
a transmit baseband processing module that converts the digital image signals into digital transmit baseband or low IF signals when the RFIC is in the transmit mode, the transmit mode configured to transmit in a duplex scheme based upon a shared status of a wireless communication resource for a transmit path and a receive path.

17. The RFIC of claim 16, wherein the photodiode array circuit comprises:
a plurality of photodiodes to produce a plurality of black and white electrical signals from the received light;
a plurality of lens positioned to provide the received light to the plurality of photodiodes;
a plurality of color filters coupled to filter the plurality of black and white electrical signals to produce a plurality of color electrical signals; and
a processing module coupled to process the plurality of color electrical signals to produce the electrical image signals, wherein the processing includes at least one of: timing, exposure control, shutter control, white balance, and gain adjust.

18. The RFIC of claim 16, wherein the photodiode array circuit comprises:
a plurality of active pixel sensors.

19. The RFIC of claim 16, wherein the digital conversion module further comprises:
a digital amplifier coupled to amplify the digital receive baseband or low IF signals.

20. The RFIC of claim 16, wherein the digital conversion module comprises:
an amplifier coupled to amplify the electrical image signals to produce amplified electrical image signals;
a combining module coupled to combine the amplified electrical image signals with the down-converted signals to produce combined signals;
the analog to digital conversion module coupled to convert the combined signals into digital combined signals;
a separation module coupled to separate the digital combined signals into digital signals and digital receive baseband or low IF signals; and
an image encoding module coupled to convert the digital signals into the digital image signals, wherein the transmit RF signals are within a transmit frequency band and the receive RF signals are within a receive frequency band such that the RFIC is simultaneously in the transmit mode and the receive mode.

* * * * *